(12) United States Patent
Spradlin

(10) Patent No.: US 10,780,811 B1
(45) Date of Patent: Sep. 22, 2020

(54) ABSORBER FOR CUP HOLDER

(71) Applicant: Shaun Edward Spradlin, Enosburg Falls, VT (US)

(72) Inventor: Shaun Edward Spradlin, Enosburg Falls, VT (US)

( * ) Notice: Subject to any disclaimer, the term of this patent is extended or adjusted under 35 U.S.C. 154(b) by 0 days.

(21) Appl. No.: 16/409,282

(22) Filed: May 10, 2019

(51) Int. Cl.
  *A47B 91/00* (2006.01)
  *B60N 3/10* (2006.01)

(52) U.S. Cl.
  CPC ..................... *B60N 3/10* (2013.01)

(58) Field of Classification Search
  CPC ..... A47G 23/00; A47G 23/032; A63H 33/086
  See application file for complete search history.

(56) References Cited

U.S. PATENT DOCUMENTS

| | | | |
|---|---|---|---|
| 1,774,497 A | 8/1930 | Wandel | |
| 3,343,662 A | 9/1967 | Harvith | |
| 3,360,132 A | * 12/1967 | Harvith | A47J 31/446 210/477 |
| 3,854,448 A | * 12/1974 | Kromanaker | B05B 12/30 118/505 |
| 4,953,823 A | 9/1990 | Sheaffer et al. | |
| 5,000,413 A | 3/1991 | Kawashima | |
| 5,022,235 A | 6/1991 | Grissom | |
| D355,123 S | * 2/1995 | Romano | D9/455 |
| 5,527,225 A | 6/1996 | Mansfield | |
| 5,712,012 A | 1/1998 | Forman et al. | |
| 5,938,162 A | 8/1999 | Honjo | |
| 6,238,762 B1 | 5/2001 | Friedland et al. | |
| 7,328,876 B2 | 2/2008 | Jones | |
| D852,587 S | * 7/2019 | Levine | D7/624.1 |
| 10,342,382 B2 | * 7/2019 | Bazley | A47J 45/10 |
| 2004/0224059 A1 | 11/2004 | Esparza | |
| 2007/0014961 A1 | 1/2007 | Schneider | |
| 2007/0138187 A1 | * 6/2007 | Glass | B65D 23/14 220/694 |
| 2008/0203264 A1 | * 8/2008 | Lombard | A47G 23/03 248/346.11 |
| 2011/0050431 A1 | * 3/2011 | Hood | A47G 19/2227 340/603 |
| 2013/0206782 A1 | 8/2013 | Lee | |
| 2015/0216344 A1 | * 8/2015 | Arzumanyan | A47G 23/0306 248/346.11 |

* cited by examiner

*Primary Examiner* — Amy J. Sterling

(74) *Attorney, Agent, or Firm* — Paul Frank + Collins P.C.

(57) ABSTRACT

An absorbing device is configured to fit into standard vehicle cup holders. These configurations may include an absorbing body with a breakable connection disposed in the absorbing body. The breakable connection may circumscribe a removeable area of the absorbing body that is small than the absorbing body in its entirety. In one implementation, the breakable connection permits the area to remove from the absorbing body while leaving the absorbing body intact.

17 Claims, 4 Drawing Sheets

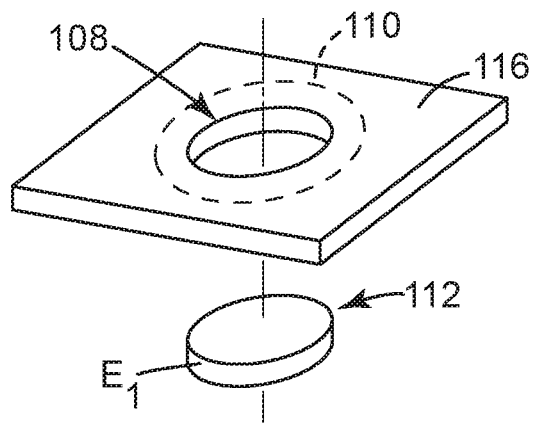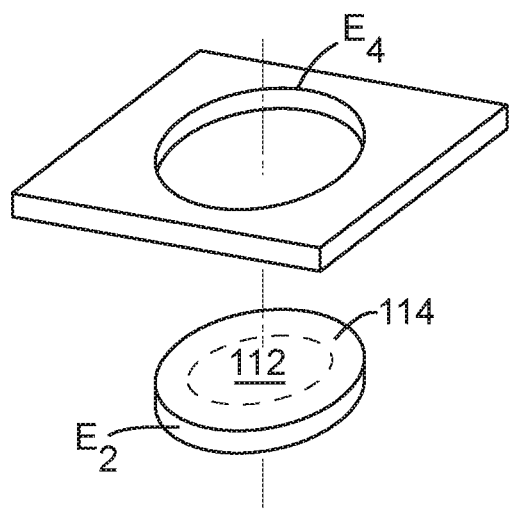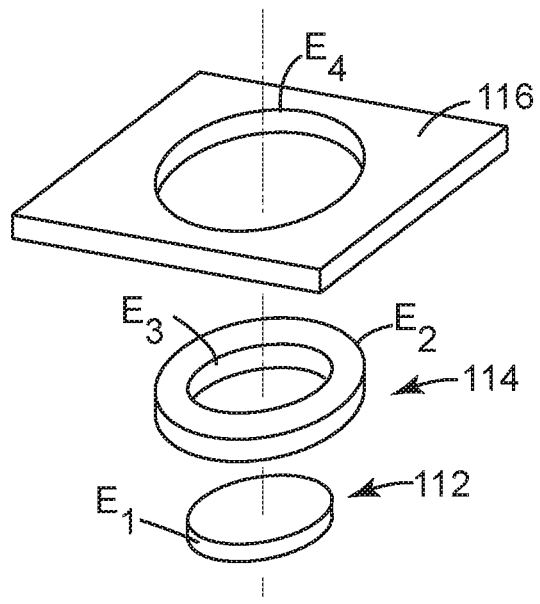

ABSORBER FOR CUP HOLDER

BACKGROUND

Cup and drink holders are ubiquitous devices in modern-day vehicles. These devices employ designs that attempt a "one-size-fits-all" strategy. The designs are meant to support a wide range of beverage containers, from cans and bottles to personal coffee thermoses and more. But in reality manufacture of the cup holder merely results in a molded plastic "tray" with receptacles that have very little size variation. One issue with this strategy is, of course, that there are few, if any, limits on geometry (and even less for size) of beverage containers. Such variation among candidate containers can exacerbate dimensional mismatch with the cup holder. This mismatch can allow the container to wobble, rattle, or vibrate with the vehicle in motion. Ultimately, spills may occur that soil the interior of the cup holder. But the molded receptacles are hardly conducive to effective clean-up and sanitization because, often, the vehicle owner can't even get their hand in position to mop up all of the spilled liquid. Any remnants can create a sticky residue that is both unsightly and potentially an area susceptible to mold and mildew.

SUMMARY

The subject matter of this disclosure describes improvements to avoid this mess and hassle. Of particular interest are embodiments of a device that is size-adjustable to fit into the molded receptacle of vehicle drink holders. These embodiments may soak up spilled liquid to eliminate the messy residue. As an added benefit, the device can easily remove from the cup holder to free up space for the end use to insert another one in its place.

DRAWINGS

Reference is now made briefly to the accompanying drawings, in which:

FIG. 2 depicts a perspective view of a configuration for the absorber of FIG. 1;

FIG. 3 depicts a perspective view of a configuration for the absorber of FIG. 1;

FIG. 4 depicts a perspective view of a configuration for the absorber of FIG. 1;

Figure 1:
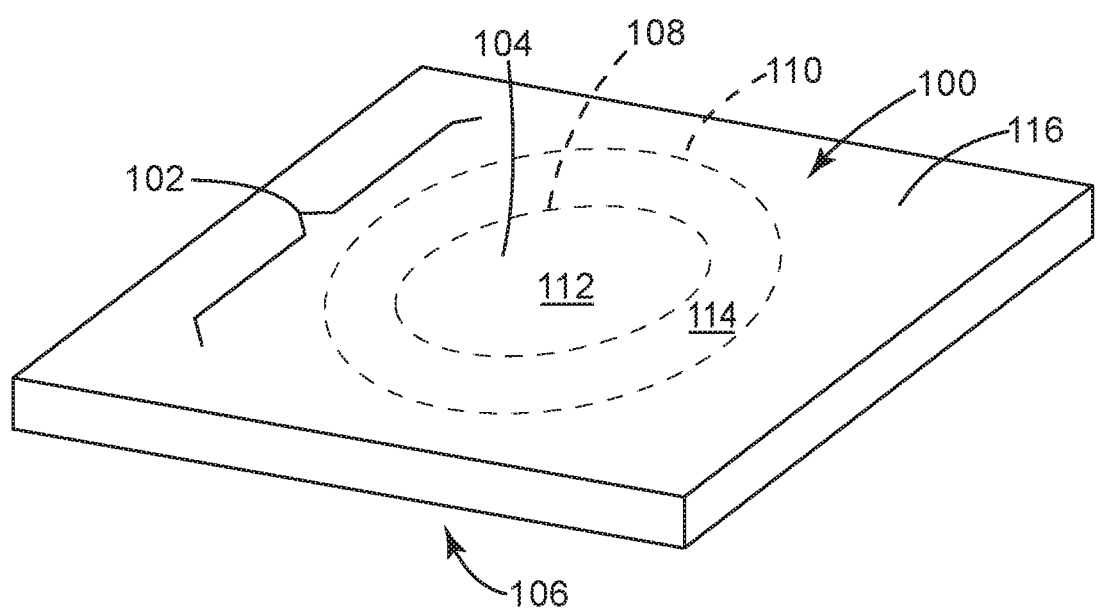
FIG. 1 depicts a perspective view of an exemplary embodiment of an absorber that may find use in a vehicle cup holder.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The discussion now turns to describes various features found in the drawings above. These features are part of embodiments of a device or "an adjustable absorber" that may find use in a vehicle cup holder. This device provides an end user with a simple, cost effective solution to protect the bottom of the cup holder from liquids that spill from a beverage container. Consumers may also benefit from the device's adjustable or sizeable design. This feature may accommodate dimensions of receptacles on in-vehicle cup holders that prevail across different vehicle styles. The adjustment can maintain integrity of the absorber and its parts to provide, in on implementation, a pair of devices that can be used together to mitigate spills and mess. Other embodiments are within the scope of this disclosure.

FIG. 1 depicts a perspective view of an exemplary embodiment of an adjustable absorber 100. This embodiment may have a body 102 with a top side 104 and a bottom side 106. The body 102 may comprise materials with properties to absorb (or partially-absorb) liquids, likes water and other beverages. The material may also facilitate cleaning, disinfecting, or polishing, for example, of surfaces on the vehicle cup holder (as well as upholstery, dashboards, center consoles, and the like). These "cleaning" materials may impregnate the body 102, for example, on one or both the sides 104, 106 or any exposed edges. Scents, colors, artwork, or other sensory design features may be included as well. It may also benefit the design for the body 102 to exhibit other properties, like mechanical stiffness that is sufficient to maintain planarity of the sides 104, 106 under a "load." Examples of the load may include beverage containers or drinking receptacles that may reside on the top side 104 with the absorber 100 in position in a vehicle cup holder. Other mechanical properties for the device may damp vibrations, as well. The structure may be arranged so the material is homogenous throughout or, in some implementations, may embody a layered structure or "laminate" with several layers of the same or different material.

The design may incorporate features to adjust the size of the absorber 100. These features may include interfaces (e.g., a first interface 108 and a second interface 110). The interfaces 108, 110 may embody breakable or "frangible" connections. Geometry for these connections may form concentric circles, although other shapes like square or rectangular may suffice as well. These circular connections may separate the body 102 into individual regions or "members" (e.g., a first annular member 112 and a second annular member 114). The second interface 110 may couple the second annular member 114 with a thin, planar sheet 116, possibly square or rectangular in shape. In use, an end user can separate the members 112, 114 from one another and from the sheet 116 at the interfaces 108, 110. Preferably, separation occurs without aid of a tool, like a scissors or a knife. The members 112, 114 and the sheet 116 may be made from the same, unitary piece of material to simplify manufacture of the body 102. The connections 108, 110 may utilize a pattern of openings or "perforations" that penetrate in this unitary piece.

FIGS. 2, 3, and 4 depict perspective views of configurations for the absorber 100 of FIG. 1. Each configuration may adapt the absorber 100 to fit dimension for the receptacle of the in-vehicle cup holder. In FIG. 2, the configuration corresponds with release of the first member 112 from the second member 114 along the innermost perforation 108. The first member 112 may form a disc. FIG. 3 depicts the configuration that corresponds with release of the members 112, 114 adjoined to one another but separate from the planar sheet 116 along the outermost perforation 110. The second member 114 may also form a disc that has a diameter that is larger than the disc 112. As best shown in FIG. 4, the configuration corresponds with release of the members 112, 114 from the sheet 116 along the outermost connection 110, as well as release of the first member 112 from the second member 114 along the innermost connection 108. The second member 114 forms an annual ring. Notably, in each configuration, the perforations 108, 110 may allow the members 112, 114 to remain intact, for example, without breaks, cuts, or tears. This feature can maintain any peripheral edge(s) E as generally contiguous or "unbroken," for example, the outer peripheral edge $E_1$ of the first member 112 and the outer peripheral edge $E_2$ and the inner peripheral edge $E_3$ of the annular ring 114. The thin sheet 116 may also remain continuous along the inner peripheral edge $E_4$.

Figure 5:
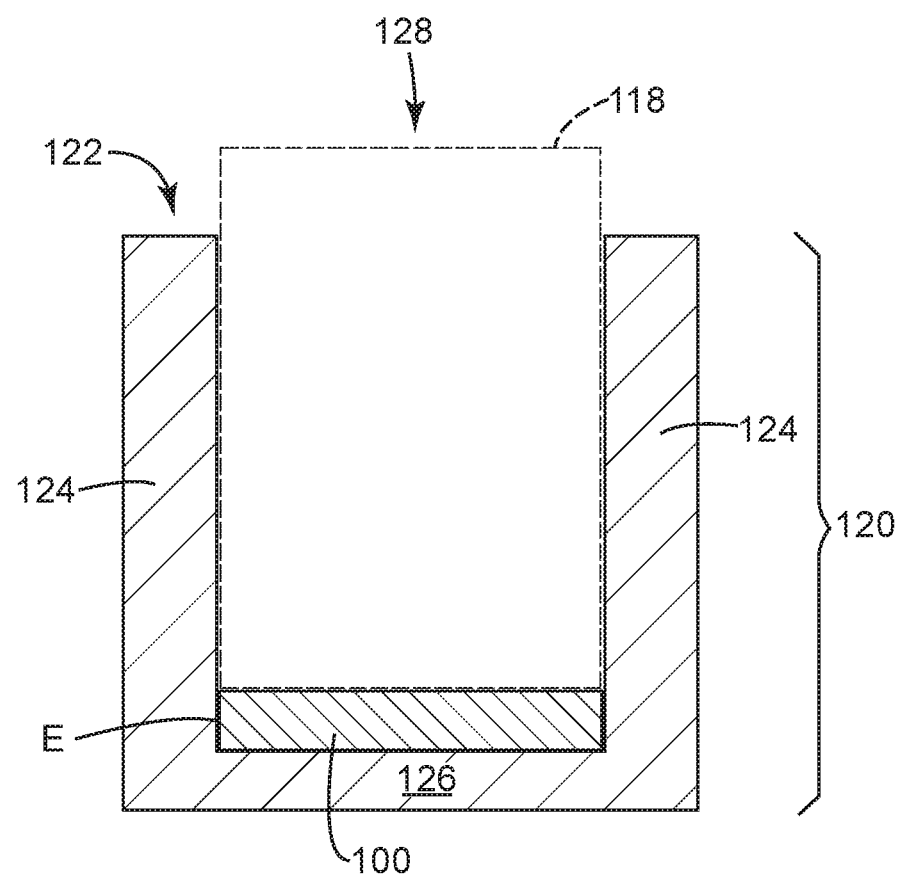
FIG. 5 depicts an elevation view of the cross-section of an example of the absorber of FIG. 1 in position in a cup holder.

FIG. 5 depicts an elevation view of the cross-section of an example of the absorber 100 of FIG. 1. This example is in position to support a container 118 in a cup holder 120, for example, one that might reside in a vehicle (e.g., car, truck, boat, or plane). The cup holder 120 may have a peripheral wall 122 with sides 124 that terminate at a base 126. The sides 124 may bound a recess 128, typically cylindrical or substantially circular in cross-section area. In one implementation, the absorber 100 may insert into the recess 128 to reside at the bottom of the recess 128. The base 126 may support the absorber 100 to expose one of the sides (e.g., the top side 104). This arrangement creates a stable platform that can support the container 118. Contact between the peripheral edge E and the sides 124 may find favor to avoid ingress of liquid therebetween; but this disclosure contemplates that such an arrangement is not always necessary. In use, the end user may use the breakable connections 108, 110 to size the absorber 100 to fit or insert into the recess 126. For circular cross-sections of large-diameters, the end user may keep the innermost perforation 108 intact to maintain the members 112, 114 together. Smaller diameters may require the end user to break the innermost perforation 108 to release the first member 112 from the second member 114.

Figure 6:
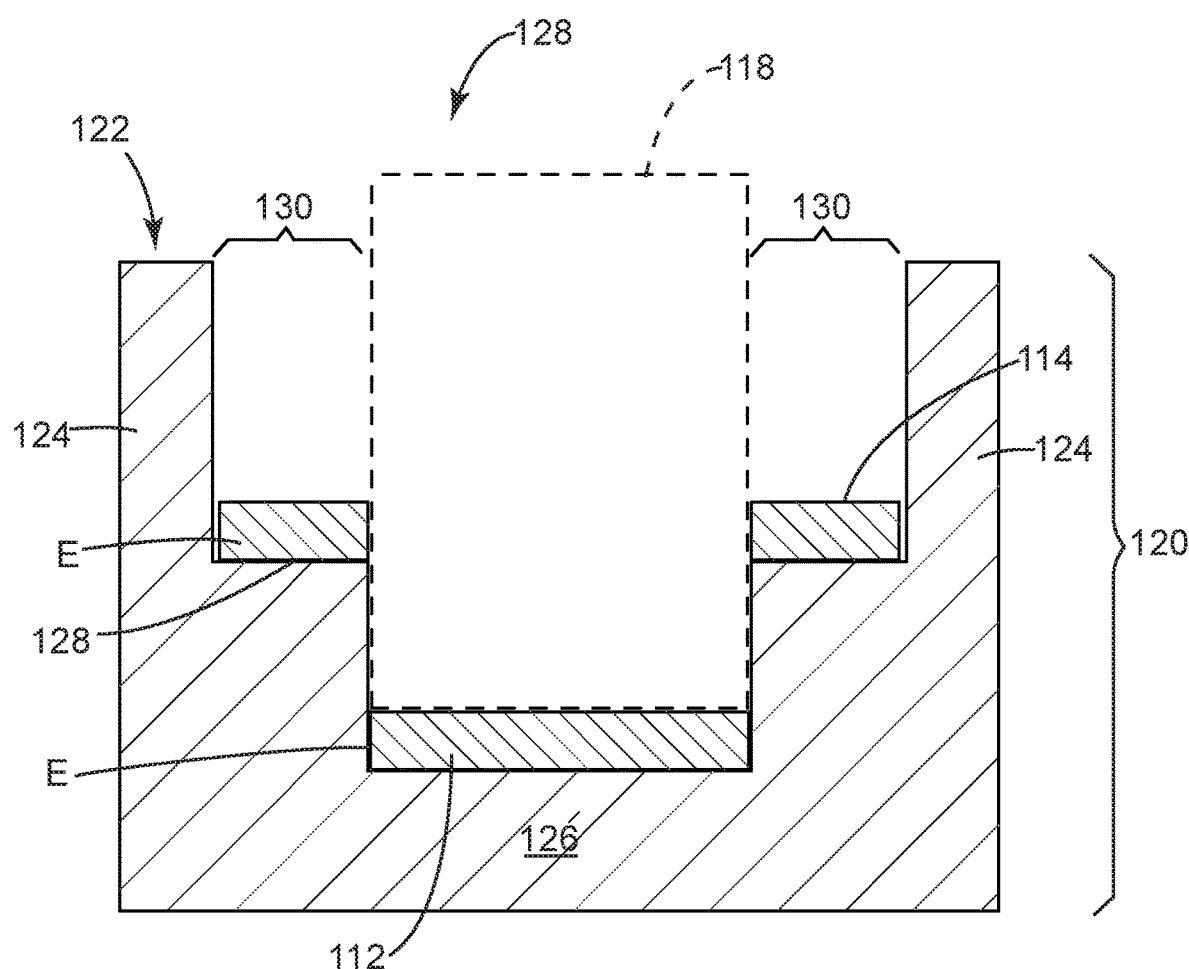
FIG. 6 depicts an elevation view of the cross-section of an example of the absorber of FIG. 1 in position in a cup holder.

FIG. 6 depicts an elevation view of the cross section of another example of the absorber 100 of FIG. 1. The peripheral wall 120 of the cup holder 118 may form a shoulder 130 with a planar surface 132 set apart from the base 126. The first member 112 of absorber 100 may reside at the bottom of the recess 128. The second member 114 may form an annular ring that fits over the container 118 to reside on the planar surface 132 of the shoulder 130. In use, the end user may separate the members 112, 114 from one another, forming two parts of the absorber 100 with the smallest-diameter member 112 resident at the base 126 and the annular ring 114 resident at the shoulder 130. This arrangement may serve to absorb spills. As an added benefit, the annular ring 114 may fit snuggly around the container 118 or buttress the container 118 against the sides 124. This feature can prevent relative movement of the container 118 in the recess 128.

In light of the foregoing, the improvements herein solve problems that predominate the hard, molded cup holders found in vehicles. The proposed "absorber" may fit or conform to the opening or recess in these cup holders. The size-adjustable connections foreclose the need for tools in lieu of an efficient, cost effective solution that not only protects the interior space of the cup holder, but also may operate eliminate annoying "rattling" that may prevail during transit of the vehicle. The device can also easily remove from its position in the cup holder. Should a spill occur, the end user may replace the a first or "soiled" absorber with a second or "new" absorber in short order.

This written description uses examples to disclose the invention, including the best mode, and also to enable any person skilled in the art to practice the invention, including making and using any devices or systems and performing any incorporated methods. An element or function recited in the singular and proceeded with the word "a" or "an" should be understood as not excluding plural said elements or functions, unless such exclusion is explicitly recited. References to "one embodiment" of the claimed invention should not be interpreted as excluding the existence of additional embodiments that also incorporate the recited features. Furthermore, the claims are but some examples that define the patentable scope of the invention. This scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

Examples appear below that include certain elements or clauses one or more of which may be combined with other elements and clauses describe embodiments contemplated within the scope and spirit of this disclosure.

What is claimed is:

1. A liner for a cupholder, comprising:
   an absorbing body;
   a first breakable connection disposed in the absorbing body, the first breakable connection circumscribing a first removable area of the absorbing body that is smaller than the absorbing body in its entirety; and
   a second breakable connection disposed in the absorbing body and concentric with the first breakable connection, the second breakable connection circumscribing a second removable area that is larger than the first removable area,
   wherein the first breakable connection permits the first removable area to remove from the second removable area while leaving the absorbing body intact, and
   wherein removing the removable area creates an annular ring that has an outer peripheral edge that is unbroken and an opening that substantially contacts an outer surface on a beverage container.

2. The liner of claim 1, wherein removing the removable area creates an annular ring that has an inner peripheral edge that is unbroken.

3. The liner of claim 1, wherein the first breakable connection comprises perforations.

4. The liner of claim 1, wherein the first breakable connection comprises a circular pattern of perforations.

5. The liner of claim 1, further comprising:
   a thin sheet connected to the absorbing body at a second breakable connection.

6. The liner of claim 5, wherein the second breakable connection comprises perforations.

7. The liner of claim 1, further comprising:
   a sheet connected to the absorbing body at the second breakable connection, wherein the second breakable connection permits the second removeable area to remove from the sheet while leaving the sheet intact.

8. The liner of claim 7, wherein the second breakable connection comprises a circular pattern of perforations.

9. The liner of claim 1, wherein the absorbing body has at least one surface impregnated with a cleaning solution.

10. An apparatus, comprising:
    a first disc of a first material having a first outer perforated edge, the first material adapted to absorb liquid;

a second disc of a second material incorporated into the first disc and having a second outer perforated edge, wherein the first disc attaches to the second disc at the second outer perforated edge so that the first outer perforated edge is concentric with the second outer perforated edge; and a flat sheet attached to the first outer perforated edge and circumscribing the disc in its entirety, wherein removing the first disc and the second disc from the flat sheet creates an annular ring that has an outer peripheral edge that is unbroken and an opening that substantially contacts an outer surface on a beverage container.

11. The apparatus of claim 10, wherein the first outer perforated edge forms a contiguous boundary between the first disc and the flat sheet.

12. The apparatus of claim 10, wherein the first material and the second material are the same.

13. The apparatus of claim 10, wherein the first disc is larger in diameter than the second disc.

14. The apparatus of claim 10, wherein the first outer perforated edge and the second outer perforated edge form outer annular boundaries of an annular ring of the first material.

15. A kit comprising:

an annular ring adapted to absorb liquid;

a disc adapted to absorb liquid, the disc smaller in diameter than an inner diameter of the annular ring, wherein the disc attaches to the annular ring at a first breakable connection; and a sheet attached about to the annular ring at a second breakable connection that is concentric with the first breakable connection, wherein the annular ring has an opening that substantially contacts an outer surface on a beverage container.

16. The kit of claim 15, wherein the annular ring has a continuous inner edge after removing the disc at the first breakable connection.

17. The kit of claim 15, wherein the annular ring and the disc are made of the same liquid-absorbing material.

* * * * *